(12) United States Patent
Lee et al.

(10) Patent No.: US 8,310,559 B2
(45) Date of Patent: Nov. 13, 2012

(54) METHOD AND APPARATUS FOR TRANSMITTING/RECEIVING DATA

(75) Inventors: Sang-jin Lee, Seoul (KR); Yoon-cheol Shin, Seoul (KR); Chang-woo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1460 days.

(21) Appl. No.: 11/853,946

(22) Filed: Sep. 12, 2007

(65) Prior Publication Data

US 2008/0084935 A1 Apr. 10, 2008

(30) Foreign Application Priority Data

Oct. 4, 2006 (KR) ........................ 10-2006-0097553

(51) Int. Cl.
*H04N 5/225* (2006.01)
(52) U.S. Cl. ...................... 348/222.1; 348/552; 358/1.15
(58) Field of Classification Search ............... 348/222.1, 348/465, 468, 612, 617, 624, 630, 645, 242, 348/473, 476–479, 552, 649–651, 708; 345/589, 345/590, 600, 591, 603, 604; 358/1.15, 1.9, 358/518, 539

See application file for complete search history.

(56) References Cited

U.S. PATENT DOCUMENTS

| | | | |
|---|---|---|---|
| 6,774,951 B2 * | 8/2004 | Narushima | 348/552 |
| 6,806,978 B1 * | 10/2004 | Tamura et al. | 358/1.15 |
| 2003/0164976 A1 * | 9/2003 | Ihara et al. | 358/1.15 |
| 2007/0132866 A1 * | 6/2007 | Lee et al. | 348/254 |
| 2007/0133021 A1 * | 6/2007 | Lee et al. | 358/1.9 |

FOREIGN PATENT DOCUMENTS

| | | |
|---|---|---|
| EP | 0 668 704 A2 | 8/1995 |
| JP | 2002-189465 A | 7/2002 |

* cited by examiner

*Primary Examiner* — Annan Shang
(74) *Attorney, Agent, or Firm* — Sughrue Mion, PLLC

(57) ABSTRACT

A method and apparatus for transmitting/receiving data in which a color gamut identifier is included using a synchronization section of an analog image signal are provided. In the method, it is determined whether an analog image signal is a color gamut signal. If the analog signal is a color gamut signal, a color gamut identifier is generated using a synchronization section of the analog image signal, and the analog image signal is transmitted after the color gamut identifier is added to the synchronization section of the analog image signal.

16 Claims, 9 Drawing Sheets

A : DATA
B : FRONT PORCH
C : HORIZONTAL SYNC
D : BREEZE WAY
E : COLOR BURST
F : BACK PORCH
G : HORIZONTAL BLANKING (a)  (b)

(a)  (b)

(a)  (b)

(a)  (b)

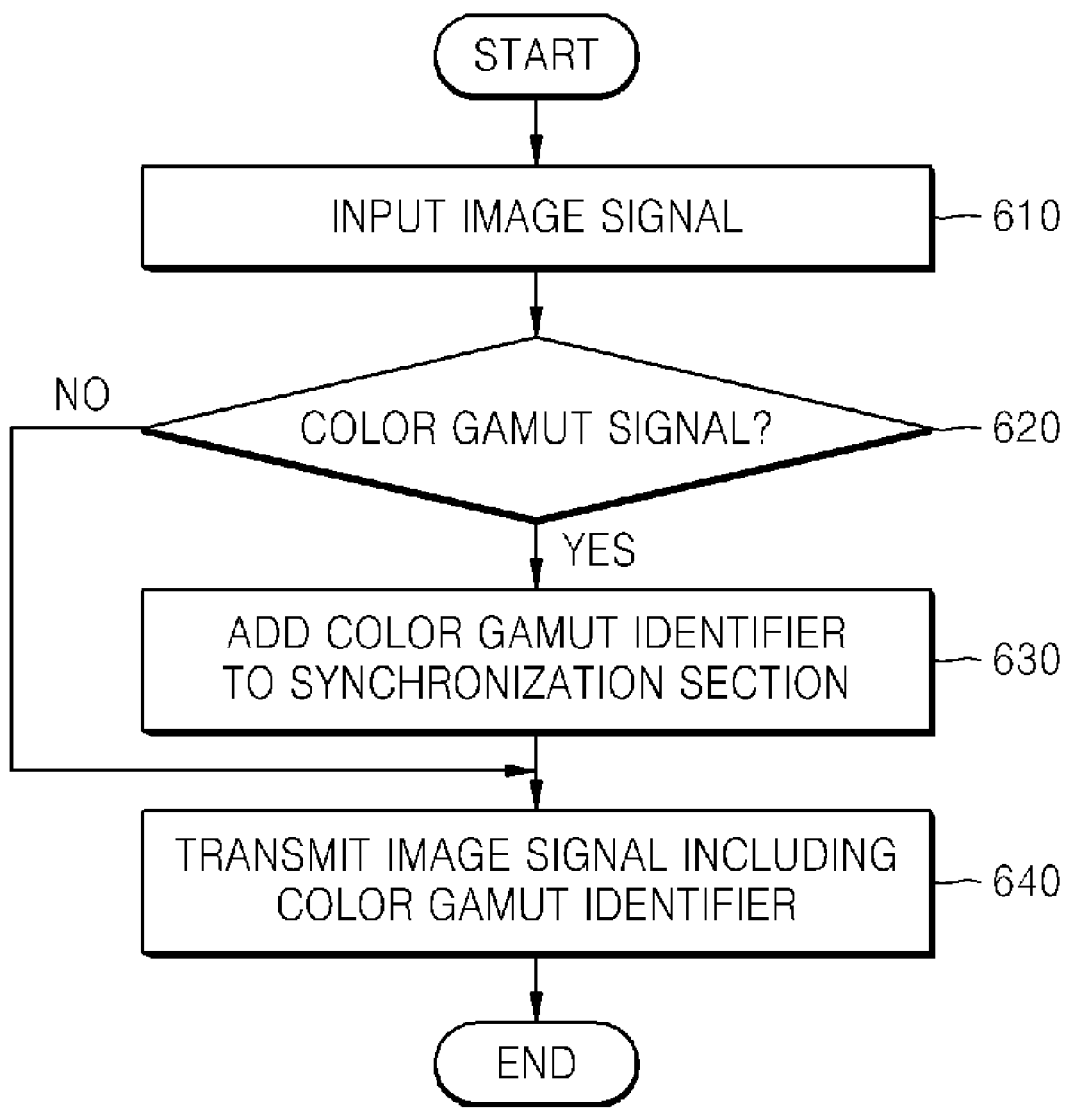

METHOD AND APPARATUS FOR TRANSMITTING/RECEIVING DATA

CROSS-REFERENCE TO RELATED PATENT APPLICATION

This application claims priority from Korean Patent Application No. 10-2006-0097553, filed on Oct. 4, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to a system for transmitting/receiving data based on an analog image signal standard, and more particularly, to a method and apparatus for transmitting/receiving data in which a color gamut identifier is included using a synchronization section of an analog image signal.

2. Description of the Related Art

A related art multimedia system includes a multimedia source (e.g., a digital video disc (DVD) player and a set-top box) providing a multimedia signal and a multimedia output device (e.g., a television) outputting the multimedia signal received from the multimedia source.

The range of color that can be obtained using the BT.601 standard or a YCbCr color signal is about one-third of the range of color that the human eye can recognize. With the development of image encoding technologies, recent multimedia output devices have a color reproduction range wider than the YCbCr color space.

Related art multimedia sources transmit multimedia signals based on a transmission standard selected depending on the type of interfaces or signals. However, related art analog transmission standards or related art multimedia interfaces such as a digital video interface (DVI) do not have procedures or a mechanism for transmitting color gamut information such as extended video YCbCr (xvYCC). Therefore, when an image signal is received, a related art multimedia output device cannot determine whether the image signal is an extended color gamut signal, and thus it is difficult for the multimedia output device to display an image according to the full range of colors (gamut) of the image.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of transmitting/receiving data in which a color gamut identifier is added using a synchronization section of an analog image signal so as to allow an image output device (receiver) to determine that the color gamut is extended.

The present invention also provides an apparatus for transmitting/receiving data in which a color gamut identifier is added using a synchronization section of an analog image signal so as to allow an image output device (receiver) to determine that the color gamut is extended.

According to an aspect of the present invention, there is provided a method of transmitting data, the method including: determining whether an analog image signal is a color gamut signal; if the analog image signal is a color gamut signal, generating a color gamut identifier using a synchronization section of the analog image signal; and transmitting the analog image signal after adding the color gamut identifier to the synchronization section of the analog image signal.

According to another aspect of the present invention, there is provided a method of receiving an analog image signal in which a color gamut identifier is added to a synchronization section, the method including: extracting the color gamut identifier by detecting a predetermined pattern from the synchronization section of the analog image signal; and processing a color gamut signal using the analog image signal according to the extracted color gamut identifier.

According to another aspect of the present invention, there is provided an apparatus for transmitting data, the apparatus including: a signal input unit receiving an analog image signal; a control unit determining whether the analog image signal is a color gamut signal; and a signal processor unit adding a color gamut identifier to the analog image signal by adding a predetermined pattern signal to or modifying a synchronization section of the analog image signal according to the determination result by using the control unit and transmitting the analog image signal.

According to another aspect of the present invention, there is provided an apparatus for receiving an analog image signal in which a color gamut identifier is added to a synchronization section by a transmitter, the apparatus including: a color gamut identifier detection unit detecting the color gamut identifier by extracting a predetermined pattern from the synchronization section of the analog image signal, the predetermined pattern being a promised pattern between the color gamut identifier detection unit and the transmitter; a signal processor unit processing a wide color gamut signal using the analog image signal according to the detected color gamut identifier; and a display unit displaying the wide color gamut signal processed by the signal processor unit.

BRIEF DESCRIPTION OF THE DRAWINGS

The above and other aspects of the present invention will become more apparent by describing in detail exemplary embodiments thereof with reference to the attached drawings in which:

FIG. 6 is a flowchart of a method of transmitting data according to an exemplary embodiment of the present invention.

DETAILED DESCRIPTION OF THE INVENTION

The present invention will now be described more fully with reference to the accompanying drawings, in which exemplary embodiments of the invention are shown.

Figure 1:
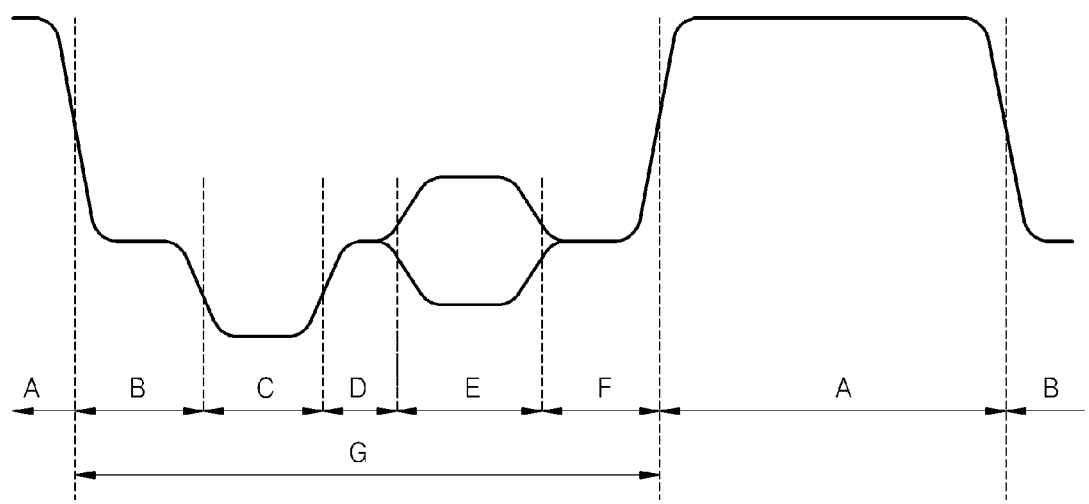
FIG. 1 is a diagram for explaining a related art transmission standard for transmitting an analog image signal.

FIG. 1 is a diagram for explaining a related art transmission standard for transmitting an analog image signal.

Referring to FIG. 1, according to a related art transmission standard, an analog image signal for a line of an image can be divided into a horizontal blanking section (G) and a data section (A). The horizontal blanking section (G) is added to the analog image signal to synchronize scanning times of a transmitter and a receiver. The horizontal blanking section (G) includes a front porch section (B), a horizontal synchronization section (C), a breeze way section (D), a color burst section (E), and a back porch section (F). The analog image signal can have a different synchronization waveform from that shown in FIG. 1, or the horizontal synchronization section (C) or the color burst section (E) can be excluded from the analog image signal depending on the related art transmission standard.

Figure 2:
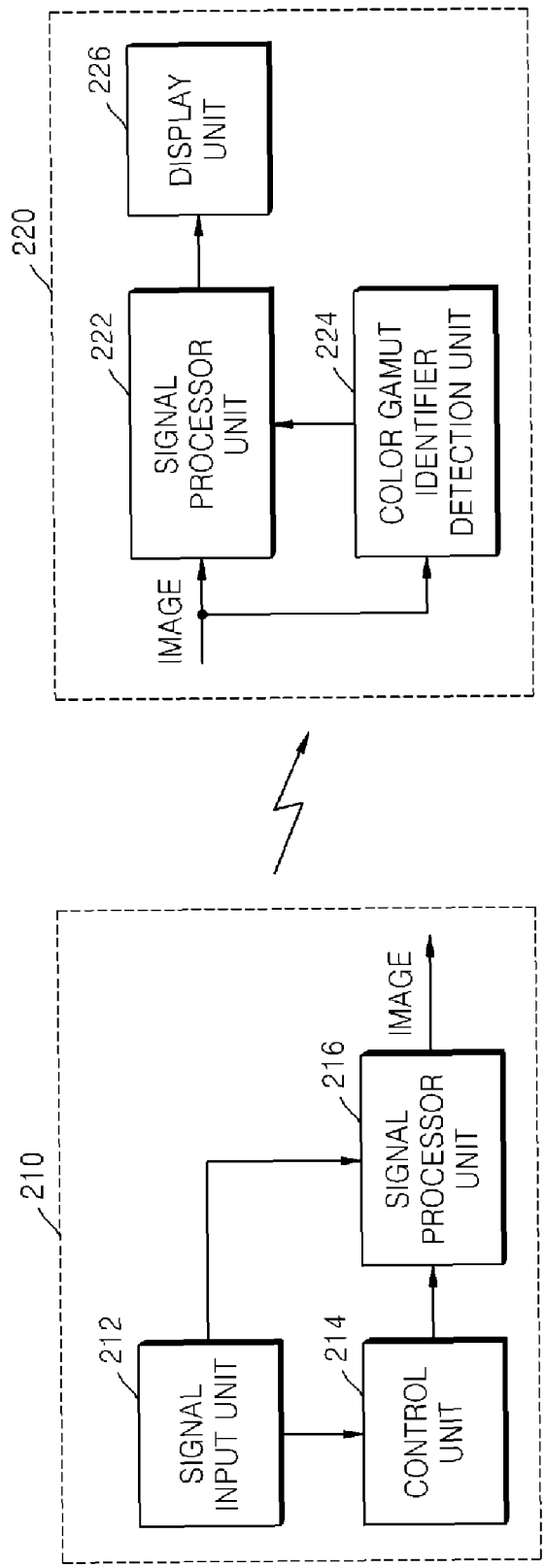
FIG. 2 is a block diagram illustrating an apparatus for transmitting/receiving data according to an exemplary embodiment of the present invention.

FIG. 2 is a block diagram illustrating an apparatus for transmitting/receiving data according to an exemplary embodiment of the present invention.

The data transmitting/receiving apparatus includes a transmitter 210 and a receiver 220 that are connected by a wired or wireless communication scheme.

Image signals having synchronization sections are transmitted between the transmitter 210 and the receiver 220 based on an analog transmission standard. For example, the transmitter 210 receives image signals such as a broadcast signal, a camcorder signal, or a digital video disc (DVD) signal, or generates image source signals including color gamut identifiers. The receiver 220 receives image source signals from the transmitter 210 and displays images using color gamut information included in the image source signals.

The transmitter 210 will now be described in more detail.

The transmitter 210 includes a signal input unit 212, a control unit 214, and a signal processor unit 216. An analog image signal is input through the signal input unit 212.

The control unit 214 measures the amplitude of the analog image signal input from the signal input unit 212 so as to determine whether the analog image signal is a wide color gamut signal. For example, the control unit 214 detects the color range of an image pixel from the analog image signal so as to determine whether the analog image signal is a color gamut signal. For example, when it is detected from the analog image signal that the brightness and color values of an image pixel range from 0 to 255, the control unit 214 determines that the analog image signal is an extended video YCbCr (xvYCC) color gamut signal.

When the control unit 214 determines that the analog image signal is a color gamut signal, the signal processor unit 216 generates a color gamut identifier using synchronization sections included in the analog image signal and sends the analog image signal to the receiver 220 after adding the color gamut identifier to the synchronization sections of the analog image signal. Each of the synchronization sections of the analog image signal may include a color burst section, a horizontal synchronization section, a vertical synchronization section, and a blanking section. Therefore, the signal processor unit 216 generates the color gamut identifier by modifying or adding a predetermined pattern signal to at least one of a color burst section, a vertical synchronization section, a horizontal synchronization section, a breeze way section, a front porch section, and a back porch section of the analog image signal. The color gamut identifier can be applied to a composite image signal or a component image signal.

The receiver 220 will now be described in more detail.

The receiver 220 includes a signal processor unit 222, a color gamut identifier detection unit 224, and a display unit 226. The color gamut identifier detection unit 224 detects a color gamut identifier from the synchronization sections of the analog image signal received from the transmitter 210. For example, the color gamut identifier detection unit 224 detects the color burst section of the synchronization section of the received analog image signal and determines that the received analog image signal includes xvYCC color gamut information when the color burst section has eight cycles (described in detail later with reference to FIGS. 3A through 3C).

The signal processor unit 222 processes a wide color gamut signal using the received analog image signal according to the color gamut identifier detected by the color gamut identifier detection unit 224. Meanwhile, when it is determined that the wide color gamut signal cannot be applied to a display device currently being used by using, for example, a register, the signal processor unit 222 converts the wide color gamut signal into a different-format color signal available for the color gamut of the display device currently being used, by means of a mapping process.

The display unit 226 displays the wide color gamut image signal processed by the signal processor 222.

Figure 3A:
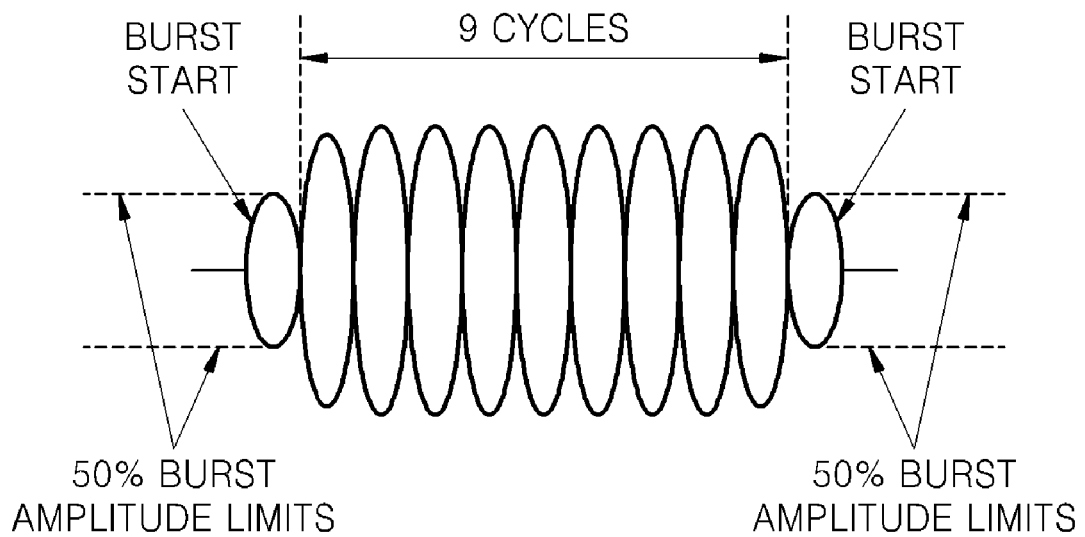
FIG. 3A illustrates a color burst signal based on a related art transmission standard.

FIG. 3A illustrates a color burst signal based on a related art transmission standard.

Referring to FIG. 3A, a standard color burst signal has nine cycles. Start and end sections are located at the start and end of the color burst signal, and the amplitude of the start and end sections is half the amplitude of the nine-cycle section of the color burst signal.

Figure 3B:
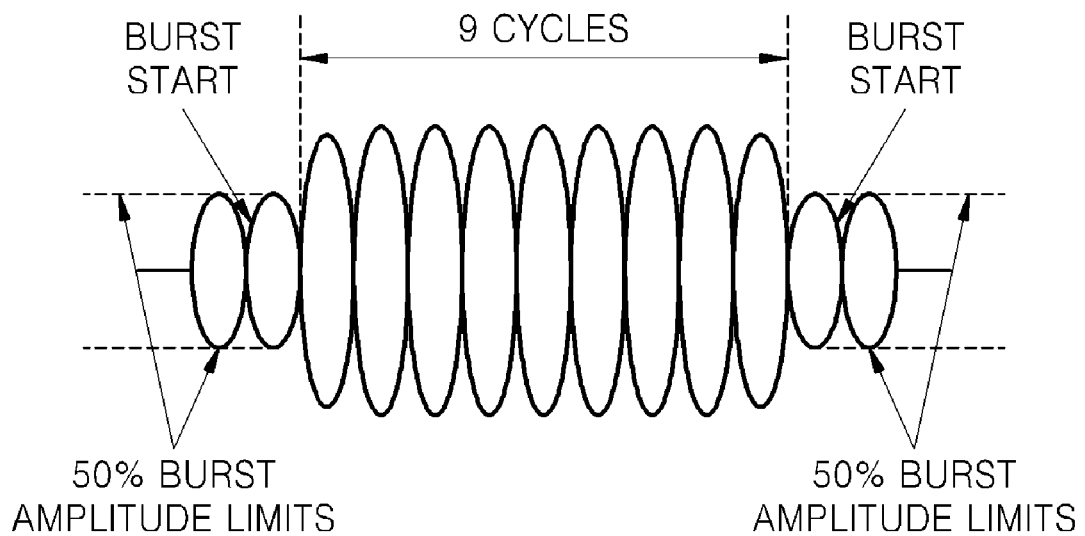
FIGS. 3B and 3C illustrate waveforms of color burst signals with color gamut identifiers according to exemplary embodiments of the present invention.
Figure 3C:
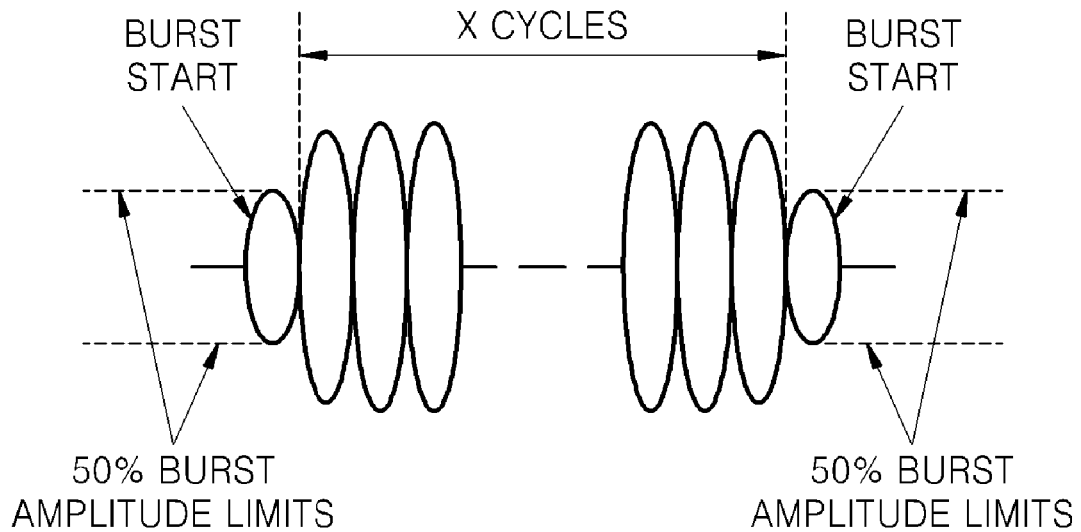

FIGS. 3B and 3C illustrate waveforms of color burst signals with color gamut identifiers according to exemplary embodiments of the present invention.

Referring to FIG. 3C, when an image signal in which a color burst section (signal) is added is a color gamut image signal, the signal processor unit 216 of the transmitter 210 processes the color burst signal in order to repeat start and end sections once more as compared with the color burst signal shown in FIG. 3A in order to indicate that the image signal is a color gamut signal.

In another exemplary embodiment, the signal processor 216 can process the color burst signal in order to repeat the start and end sections at least one time or repeat only one of the start and end sections so as to indicate that the image signal is a color gamut signal. In another exemplary embodiment, the signal processor unit 216 can remove the start and end sections from the color burst signal so as to indicate that the image signal is a color gamut signal.

Referring to FIG. 3B, when an image signal in which a color burst section (signal) is added is a color gamut signal, the signal processor unit 216 can increase or reduce the number of cycles of the color burst signal so as to indicate that the image signal is a color gamut signal. For example, the signal processor unit 216 can reduce the number of cycles of the color burst signal to eight cycles or less, or increase the number of cycles of the color burst signal to 10 cycles or more.

Figure 4A:
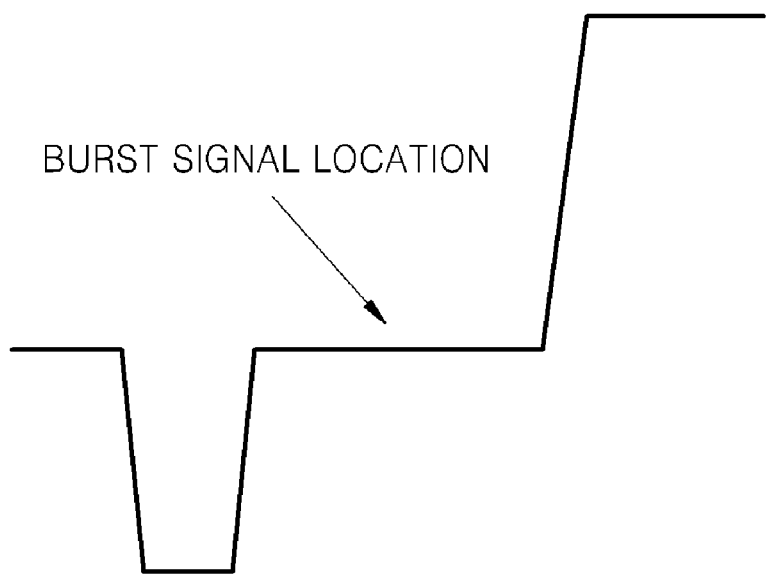
FIG. 4A illustrates a component signal with no color burst section based on a related art transmission standard.

FIG. 4A illustrates a component signal with no color burst section based on a related art transmission standard.

Y, Cb, and Cr component signals and personal computer (PC) signals for red, green, and blue colors may not include a color burst section (signal) as shown in FIG. 4A.

Figure 4B:
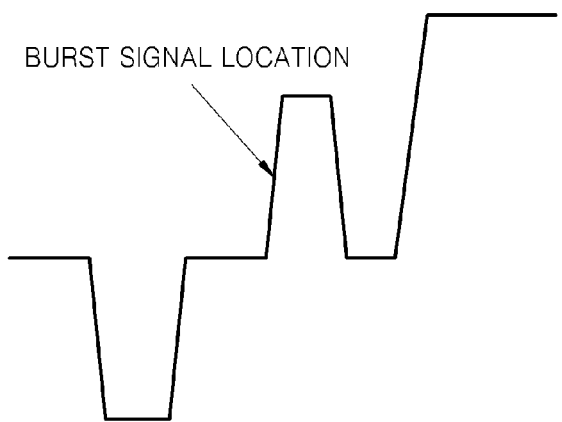
FIGS. 4B through 4C illustrate waveforms of component signals with color gamut identifiers according to exemplary embodiments of the present invention.
Figure 4C:
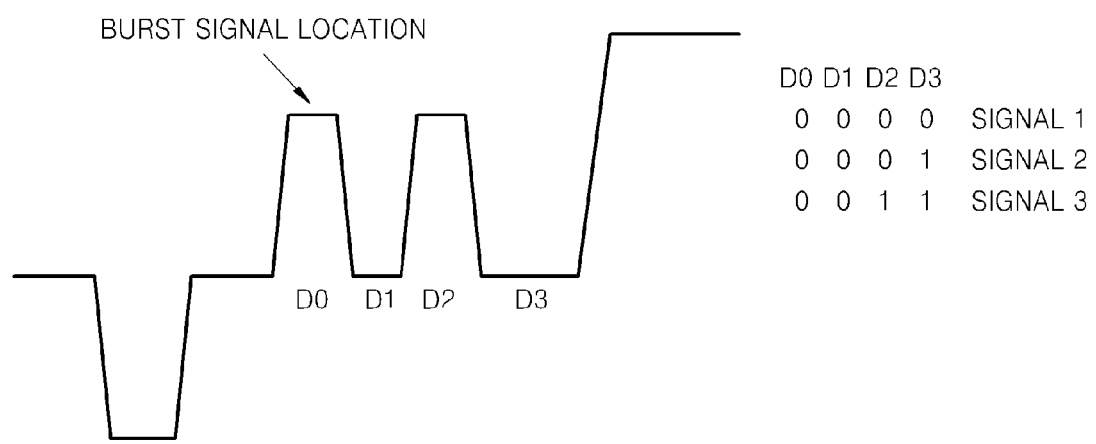

FIGS. 4B through 4C illustrate waveforms of component signals with color gamut identifiers according to exemplary embodiments of the present invention.

Referring to FIG. 4B, the signal processor unit 216 adds a color gamut identifier to a component signal by adding a section having a shape different from that of a color burst section which is added to the component signal at a location assigned for a color burst section, thereby indicating that the component signal is a color gamut signal.

Referring to FIG. 4C, the signal processor unit 216 adds a coded section to a component signal at a location assigned for a color burst section so as to indicate that the component signal is a color gamut signal. For example, when D0, D1, D2, and D3 of the coded section are 0000, 0001, or 0011, the component signal is a first color gamut signal, a second color gamut signal, or a third color gamut signal. In order to achieve this, a transmitter and a receiver use a preset coding rule so as to recognize various color gamut information.

Figure 5A:
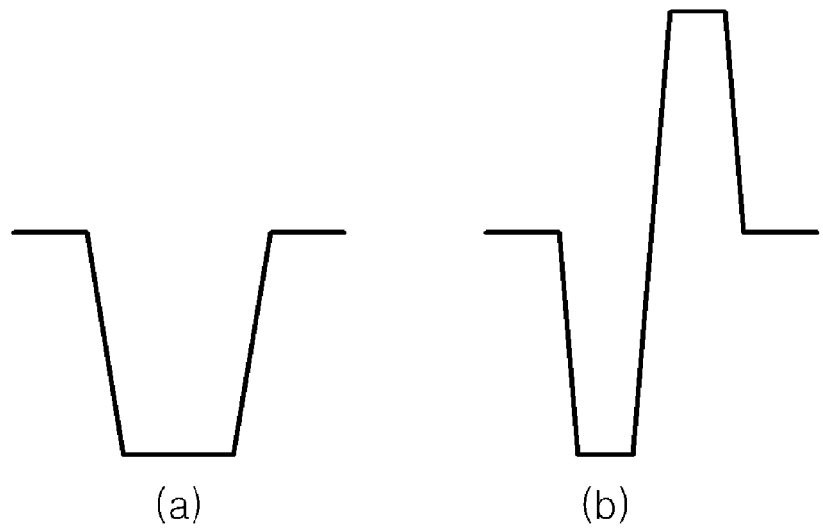
FIG. 5A illustrates a standard definition (SD) horizontal synchronization signal (a) and a high definition (HD) horizontal synchronization signal (b) that are defined based on a related art standard.

FIG. 5A illustrates a standard definition (SD) horizontal synchronization signal (a) and a high definition (HD) horizontal synchronization signal (b) that are defined based on a related art standard.

Figure 5B:
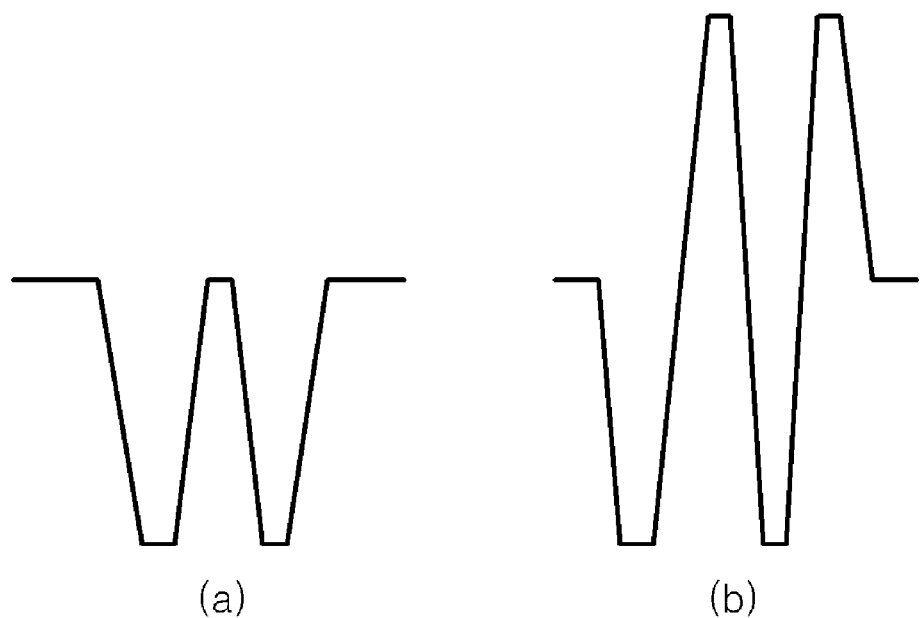
FIGS. 5B through 5D illustrate SD and HD horizontal synchronization signals with color gamut identifiers according to exemplary embodiments of the present invention.
Figure 5C:
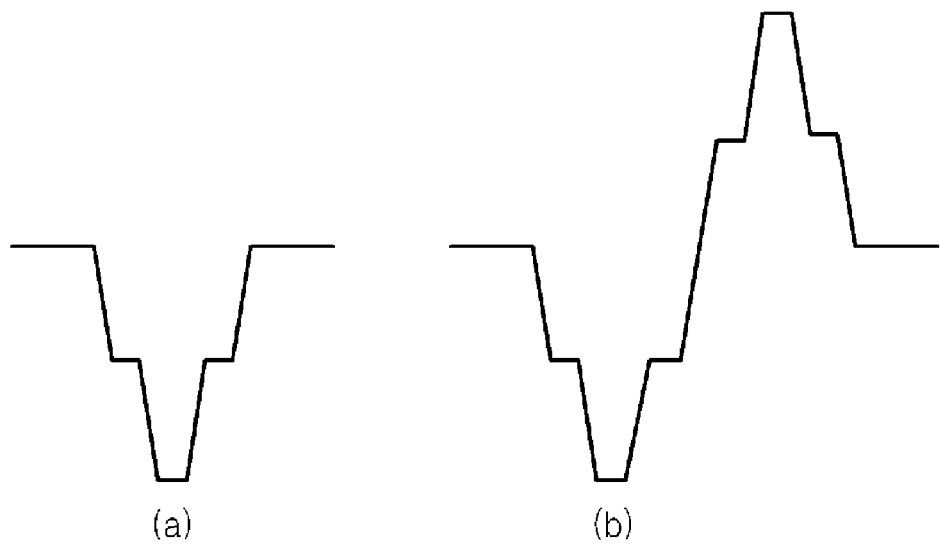
Figure 5D:
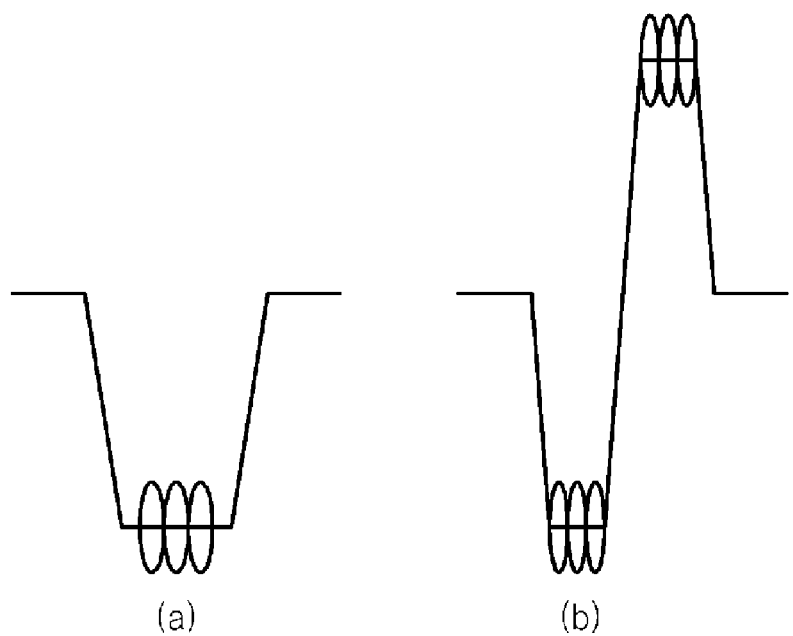

FIGS. 5B through 5D illustrate SD and HD horizontal synchronization signals with color gamut identifiers according to exemplary embodiments of the present invention.

Referring to FIG. 5B, the signal processor unit 216 according to an exemplary embodiment of the present invention makes the number of swings (oscillations) of an SD horizontal synchronization signal (a) and an HD horizontal synchronization signal (b) different from the number of swings of a related art SD horizontal synchronization signal and a HD horizontal synchronization signal so as to indicate color gamut information.

Referring to FIG. 5C, the signal processor unit 216 according to an exemplary embodiment of the present invention adds steps to SD and HD horizontal synchronization signals (a) and (b) so as to indicate color gamut information. Steps can be added to a horizontal synchronization signal in various ways. For example, the signal processor unit 216 can adds a step to a rising section or a falling section of the SD or HD horizontal synchronization signal (a) or (b).

Referring to FIG. 5D, the signal processor unit 216 according to an exemplary embodiment of the present invention adds pulses to a peak and/or valley of SD and HD horizontal synchronization signals (a) and (b) or adjusts the voltages of the SD and HD horizontal synchronization signals (a) and (b), in order to indicate color gamut information.

In another exemplary embodiment of the present invention, the signal processor unit 216 can process SD and HD vertical synchronization signals like the SD and HD horizontal synchronization signals, so as to indicate color gamut information.

In another exemplary embodiment of the present invention, the signal processor unit 216 can add (couple) a predetermined signal to the front porch section, the breeze way section, or the back porch section of an analog image signal (refer to FIG. 1) so as to indicate that the analog image signal is a color gamut signal.

FIG. 6 is a flowchart of a method of transmitting data according to an exemplary embodiment of the present invention.

In operation 610, an analog image signal is received.

In operation 620, it is determined from the amplitude of the analog image signal whether the analog image signal is a wide color gamut signal by using a related art method.

In operation 630, if the analog image signal is a wide color gamut signal, a color gamut identifier is generated using synchronization sections included in the analog image signal.

In operation 640, the color gamut identifier is added to the synchronization sections of the analog image signal, and the analog image signal is transmitted to a receiver.

Figure 7:
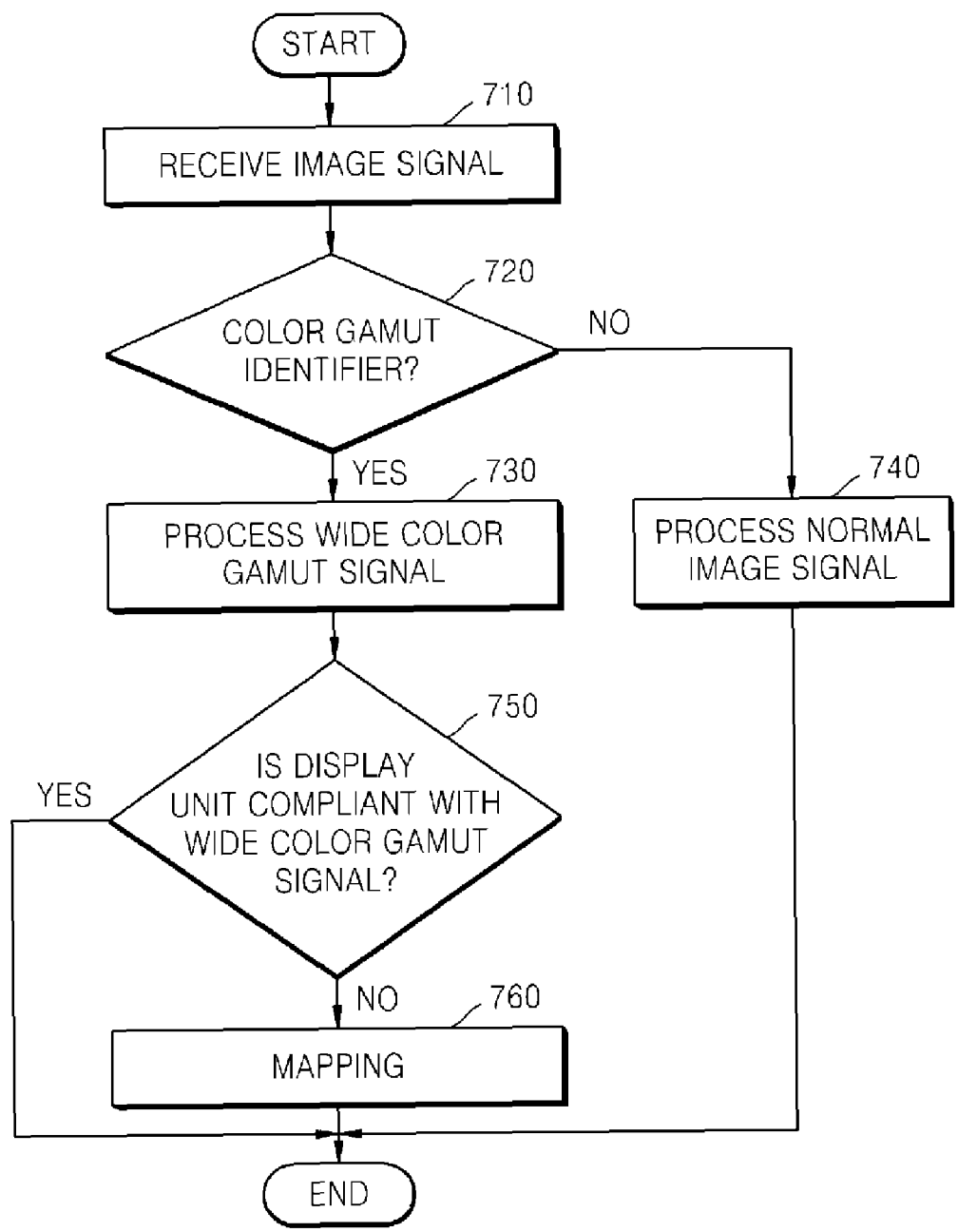
FIG. 7 is a flowchart of a method of receiving data according to an exemplary embodiment of the present invention.

FIG. 7 is a flowchart of a method of receiving data according to an exemplary embodiment of the present invention.

In operation 710, an image signal is received by using a wired or wireless communication method.

In operation 720, it is determined from synchronization sections of the received image signal whether a color gamut identifier is included in the received image signal. For example, when the number of swings for indicating a start point and an end point of a color burst section in the received image signal is two or more, it is determined that the received image signal includes an xvYCC color gamut identifier. For example, when the number of swings for indicating a start point and an end point of a color burst section in the received image signal is two, three, or four, it is determined that the received image signal includes a xvYCC, YCC, or sYCC color gamut identifier. In the latter example, a transmitter and receiver use the same rule for the relationship between the number of swings and the type of color gamut identifiers. Furthermore, the number of swings can be measured using various methods. For example, when a voltage level lower than that of the color burst section by half is measured twice in the received image signal at the start and end of the color burst section, the number of swings is two.

If a color gamut identifier is included in the received image signal, it is determined that the received image signal is a wide color gamut signal, and the wide color gamut signal is processed in operation 730. If a color gamut identifier is not included in the received image signal, it is determined that the received image signal is a normal image signal, and the normal image signal is processed in operation 740.

In operation 750, it is determined whether the wide color gamut signal can be applied to a display device currently being used.

In operation 760, if the wide color gamut signal cannot be applied to a display device currently being used, a mapping process is performed on the wide color gamut signal. For example, the wide color gamut signal is mapped (converted) into a format that can be applied to the display device currently being used.

According to the exemplary embodiment of the present invention, the receiver can determine whether a color gamut is extended or not from a received signal and process the received signal according to the determination result. Therefore, the receiver can display an image using a received signal without distortion.

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, hard disks, floppy disks, flash memories, optical data storage devices, and carrier waves (such as data transmission through the Internet). The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of transmitting data, comprising:
determining whether an analog image signal is a color gamut signal;
generating a color gamut identifier using a synchronization section of the analog image signal if the analog image signal is determined to be a color gamut signal; and
transmitting, by a transmitting apparatus, the analog image signal after adding the color gamut identifier to the synchronization section of the analog image signal.

2. The method of claim 1, wherein the generating of the color gamut identifier is performed by adding a predetermined pattern signal to or modifying at least one of a color burst section, a vertical synchronization section, a horizontal synchronization section, a breeze way section, and a front or back porch section of the analog image signal.

3. The method of claim 1, wherein the generating of the color gamut identifier is performed by increasing the number of swings of a start signal or an end signal of a color burst section of the analog image signal.

4. The method of claim 1, wherein the generating of the color gamut identifier is performed by adjusting the number of swings in a color burst section of the analog image signal.

5. The method of claim 1, wherein the generating of the color gamut identifier is performed by adding a predetermined section to a location assigned for a color burst section of the analog image signal, the predetermined section being patterned differently from the color burst section.

6. The method of claim 1, wherein the generating of the color gamut identifier is performed by adding a coded section to a location assigned for a color burst section of the analog image signal.

7. The method of claim 1, wherein the generating of the color gamut identifier is performed by patterning a horizontal or vertical synchronization section of the analog image signal into a stepped shape.

8. The method of claim 1, wherein the generating of the color gamut identifier is performed by adjusting the number of swings in a horizontal or vertical synchronization section of the analog image signal.

9. The method of claim 1, wherein the generating of the color gamut identifier is performed by adding a pulse to a peak of a horizontal or vertical synchronization section of the analog image signal.

10. A method of receiving an analog image signal in which a color gamut identifier is added to a synchronization section of the analog image signal, the method comprising:
extracting, by a receiving apparatus, the color gamut identifier by detecting a predetermined pattern from the synchronization section of the analog image signal; and
processing a color gamut signal using the analog image signal according to the extracted color gamut identifier.

11. The method of claim 10, wherein the extracting of the color gamut identifier is performed by detecting a predetermined voltage level from the synchronization section of the analog image signal so as to determine that the analog image signal is a color gamut signal.

12. An apparatus for transmitting data, comprising:
a signal input unit which receives an analog image signal;
a control unit which determines whether the analog image signal is a color gamut signal; and
a signal processor unit which adds a color gamut identifier to the analog image signal by adding a predetermined pattern signal to or modifying a synchronization section of the analog image signal according to the determination result by using the control unit and transmitting the analog image signal.

13. The apparatus of claim 12, wherein the control unit determines whether the analog image signal is a color gamut signal by detecting a color range of an image pixel from the analog signal.

14. The apparatus of claim 12, wherein the signal processor unit adds a predetermined pattern signal to or modifies at least one of a color burst section, a vertical synchronization section, a horizontal synchronization section, a breeze way section, and a front or back porch section of the analog image signal.

15. An apparatus for receiving an analog image signal in which a color gamut identifier is added to a synchronization section by a transmitter, the apparatus comprising:
a color gamut identifier detection unit which detects the color gamut identifier by extracting a predetermined pattern from the synchronization section of the analog image signal, the predetermined pattern being a promised pattern between the color gamut identifier detection unit and the transmitter;
a signal processor unit which processes a wide color gamut signal using the analog image signal according to the detected color gamut identifier; and
a display unit which displays the wide color gamut signal processed by the signal processor unit.

16. The apparatus of claim 15, wherein the signal processor unit converts a color gamut format of the analog image signal into a color gamut format of the display unit by performing a mapping process.

* * * * *